(12) United States Patent
Toguri et al.

(10) Patent No.: US 10,174,799 B2
(45) Date of Patent: Jan. 8, 2019

(54) DISK BRAKE

(71) Applicant: HITACHI AUTOMOTIVE SYSTEMS, LTD., Ibaraki (JP)

(72) Inventors: Naoki Toguri, Minami-Alps (JP); Yohei Araki, Kai (JP); Akio Miyazawa, Kofu (JP); Xuesheng Zhang, Kofu (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/513,447

(22) PCT Filed: Nov. 19, 2015

(86) PCT No.: PCT/JP2015/082532
§ 371 (c)(1),
(2) Date: Mar. 22, 2017

(87) PCT Pub. No.: WO2016/080481
PCT Pub. Date: May 26, 2016

(65) Prior Publication Data
US 2017/0307033 A1    Oct. 26, 2017

(30) Foreign Application Priority Data
Nov. 19, 2014  (JP) ................................ 2014-234512

(51) Int. Cl.
*F16D 55/225*    (2006.01)
*F16D 65/097*    (2006.01)

(52) U.S. Cl.
CPC ....... *F16D 65/0972* (2013.01); *F16D 65/097* (2013.01)

(58) Field of Classification Search
CPC ............... F16D 65/095; F16D 65/0972; F16D 65/0977; F16D 65/0978
(Continued)

(56) References Cited

U.S. PATENT DOCUMENTS 8,020,674 B2 *  9/2011  Miura ................. F16D 65/0977
                                                              188/73.38
2007/0251772 A1 * 11/2007  Tsurumi ................ F16D 65/095
                                                              188/73.38
(Continued)

FOREIGN PATENT DOCUMENTS

JP    2002-195319    7/2002
JP    2010-7695      1/2010
(Continued)

OTHER PUBLICATIONS

International Search Report dated Feb. 9, 2016 in International Application No. PCT/JP2015/082532.

*Primary Examiner* — Christopher P Schwartz
(74) *Attorney, Agent, or Firm* — Wenderoth, Lind & Ponack, L.L.P.

(57) ABSTRACT

A disk brake capable of improving work efficiency when a friction pad is attached to a mount member. Ear portions of a friction pad are inserted in pad guides of a mount member. A side push spring, which pushes the friction pad in a rotational direction of the disk, is provided at the friction pad. A pad spring is disposed between the mount member and the friction pad. The pad spring includes a guide plate portion and a guide protruding portion. The guide plate portion is attached so as to be able to abut against the pad guide of the mount member, and functions to guide the friction pad in an axial direction of the disk. The guide protruding portion extends from an outer-side portion of this guide plate portion toward an outer side in the disk axial direction. The guide protruding portion is inclined in the disk rotational direction.

5 Claims, 10 Drawing Sheets

(58) Field of Classification Search
USPC .......................................... 188/73.36–73.38
See application file for complete search history.

(56) References Cited

U.S. PATENT DOCUMENTS

| | | | |
|---|---|---|---|
| 2010/0147635 A1* | 6/2010 | Hayashi | ............... F16D 65/0972 188/73.38 |
| 2010/0187050 A1* | 7/2010 | Hayashi | ................ F16D 65/097 188/72.3 |
| 2010/0326777 A1* | 12/2010 | Noguchi | ............. F16D 65/0978 188/72.1 |
| 2011/0120821 A1 | 5/2011 | Shimamura | |
| 2015/0001011 A1* | 1/2015 | Zhang | ................ F16D 65/0972 188/72.3 |

FOREIGN PATENT DOCUMENTS

| | | |
|---|---|---|
| JP | 2011-12713 | 1/2011 |
| JP | 2012-247054 | 12/2012 |
| WO | 2010/005008 | 1/2010 |

\* cited by examiner

DISK BRAKE

TECHNICAL FIELD

The present invention relates to a disk brake that provides a braking force to a vehicle.

BACKGROUND ART

Generally, a disk brake mounted on a vehicle, such as an automobile, includes a mount member fixed to a non-rotatable portion of the vehicle, a caliper provided on this mount member displaceably in an axial direction of the disk, a pair of friction pads configured to be pressed against both surfaces of the disk by the caliper, and pad springs installed on the mount member and respectively provided between this mount member and the pair of friction pads (PTL 1).

CITATION LIST

Patent Literature

PTL 1: Japanese Patent Application Public Disclosure No. 2011-12713

SUMMARY OF INVENTION

Technical Problem

Then, to attach the friction pad to the mount member, the friction pad is attached to the mount member with the pad springs already installed thereon. At this time, the pad springs may make this process cumbersome depending on shapes of the pad springs, which may reduce work efficiency when the friction pad is attached.

Therefore, an object of the present invention is to provide a disk brake capable of improving the work efficiency when the friction pad is attached to the mount member.

Solution to Problem

To achieve the above-described object, according to an aspect of the present invention, a disk brake includes a mount member configured to be fixed to a non-rotatable portion of a vehicle and including support portions supporting a pair of friction pads disposed on both side surfaces of a disk. The support portions are formed opposite from each other on both sides in a rotational direction of the disk. The disk brake further includes a caliper disposed on this mount member displaceably in an axial direction of the disk and configured to press the pair of friction pads against the disk, and a pad spring installed on the mount member and disposed between this mount member and the friction pad. Groove portions are formed at the support portions, respectively. The groove portions are configured in such a manner that protruding portions formed at side edges of the friction pad on the both sides in the rotational direction of the disk are fitted in the groove portions. The pad spring includes a guide plate portion attached so as to be able to abut against a surface of the groove portion of the support portion on an outer side in a radial direction of the disk and a bottom surface of this groove portion. The guide plate portion is configured in such a manner that the protruding portion of the friction pad is slidably displaceable thereon in the axial direction of the disk. The pad spring further includes a guide protruding portion extending obliquely from a portion of this guide plate portion that abuts against the surface of the groove on the outer side in the radial direction of the disk in a direction away from the disk, and toward a central side of the friction pad in the rotational direction with respect to a displacement direction of the friction pad.

Advantageous Effects of Invention

According to the present invention, it is possible to improve the work efficiency when the friction pad is attached to the mount member.

DESCRIPTION OF EMBODIMENTS

Figure 1:
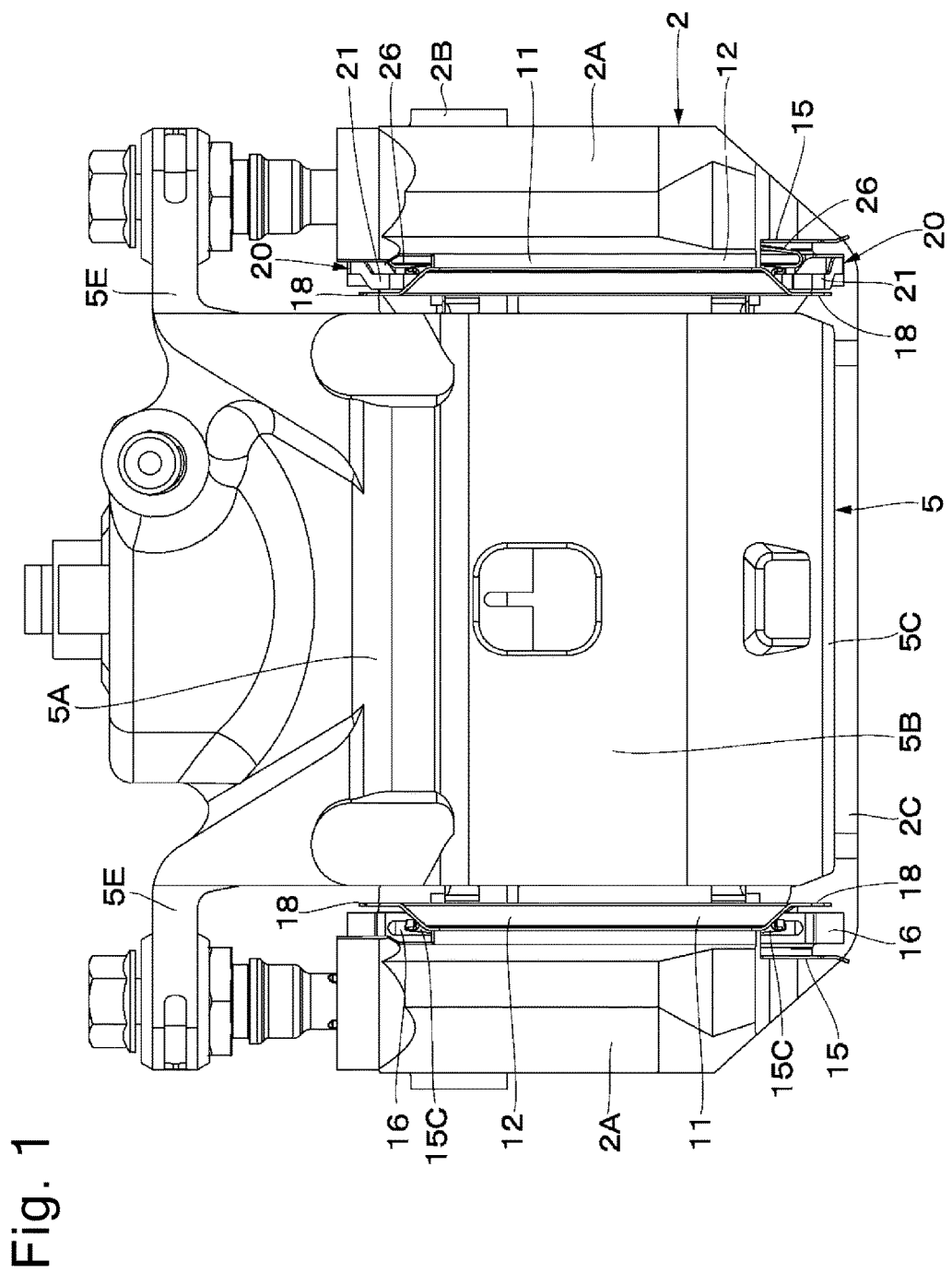
FIG. 1 is a plane view of a disk brake according to an embodiment as viewed from an outer side in a disk radial direction.

In the following description, a disk brake according to an embodiment of the present invention will be described in detail with reference to the accompanying drawings.

FIGS. 1 to 13 illustrate the present embodiment. A disk 1 (refer to FIG. 2), which rotates together with a vehicle wheel (not illustrated), is configured to, for example, rotate in a direction indicated by an arrow A (refer to FIG. 2) when a vehicle runs forward, and rotate in a direction indicated by an arrow B (refer to FIG. 2) when the vehicle runs backward.

A mount member 2 referred to as a carrier is fixed to a non-rotatable portion (not illustrated) of the vehicle, and is formed so as to extend over an outer peripheral side of the disk 1. The mount member 2 includes a pair of arm portions 2A and 2A, a support portion 2B, and a reinforcement beam 2C. The individual arm portions 2A and 2A are spaced apart from each other in a rotational direction of the disk 1 (left-right directions in FIGS. 1 and 2 and a front-back direction in FIG. 3; in the present disclosure, referred to as a disk rotational direction, a disk tangential direction, or a disk circumferential direction), and extend in an axial direction of the disk 1 (a vertical direction in FIG. 1, a front-back direction in FIG. 2, and a left-right direction in FIG. 3; in the present disclosure, referred to as a disk axial direction) so as to extend over an outer periphery of the disk 1. The individual arm portions 2A and 2A are formed opposite from each other on both sides in the disk rotational direction as support portions supporting a pair of friction pads 6, which will be described below, respectively.

The support portion 2B is provided so as to integrally connect proximal end sides of the individual arm portions 2A to each other, and is fixed to the non-rotatable portion of the vehicle at a position in an inner side of the disk 1. The reinforcement beam 2C couples distal end sides of the individual arm portions 2A to each other at a position in an outer side of the disk 1. As a result, the individual arm portions 2A of the mount member 2 are integrally coupled to each other by the support portion 2B in the inner side of the disk 1, and are integrally coupled to each other by the reinforcement beam 2C in the outer side of the disk 1.

A disk path portion (not illustrated), which arcuately extends along the outer periphery (a rotational locus) of the disk 1, is formed at intermediate portions of the individual arm portions 2A of the mount member 2 in the disk axial direction. Inner-side and outer-side pad guides 3 and 3 are formed on both sides of the disk path portion in the mount member 2 (only the outer-side pad guides 3 are illustrated). In other words, the pad guides 3 and 3 (groove portions) are formed at the mount member 2 on the inner side and the outer side while being positioned on the both sides in the disk rotational direction.

Each of the pad guides 3 and 3 includes an outer wall surface 3A, an inner wall surface 3B, and a bottom wall surface 3C. The outer wall surface 3A is a surface on an outer side in a disk radial direction that is located closer to an outer side in the radial direction of the disk 1. The inner wall surface 3B is a surface on an inner side in the disk radial direction that is located closer to an inner side in the radial direction of the disk 1. The bottom wall surface 3C is a bottom surface connecting between these wall surfaces 3A and 3B on a bottom side. The pad guide 3 is formed by these wall surfaces 3A, 3B, and 3C as a recessed groove portion (a recessed groove) extending in the disk axial direction. The outer wall surface 3A and the inner wall surface 3B are disposed in parallel with each other while being spaced apart vertically in FIG. 2.

The pad guide 3 functions to guide the friction pad 6 in the axial direction of the disk 1 between these wall surfaces 3A and 3B while sandwiching an ear portion 7B or 7C of a back plate 7 forming the friction pad 6 between the wall surfaces 3A and 3B vertically (in the disk radial direction). The bottom wall surface 3C of the pad guide 3 functions as a so-called torque receiving portion, and bears a braking torque that the friction pad 6 receives from the disk 1 when a brake operation is performed, via the ear portion 7B or 7C of the friction pad 6 and a guide plate portion 15 of a pad spring 11, which will be described below.

In other words, one of the left and right pad guides 3 and 3 illustrated in FIG. 2 that is illustrated on the left side in FIG. 2 and located on a exit side in the rotational direction (hereinafter referred to as a trailing-edge side) of the disk 1 rotating in the direction indicated by the arrow A (the bottom wall surface 3C of this pad guide 3) bears the braking torque that the friction pad 6 receives from the disk 1 when the brake operation is performed while the vehicle is running forward via the ear portion 7B of the back plate 7 of the friction pad 6 and the guide plate portion 15 of the pad spring 11. On the other hand, the brake pad 3 on the right side that is located on an entrance side in the rotational direction (hereinafter referred to as a leading-edge side) of the disk 1 rotating in the direction indicated by the arrow A (the bottom wall surface 3C of this pad guide 3) bears the braking torque that the friction pad 6 receives from the disk 1 when the brake operation is performed while the vehicle is running backward via the ear portion 7C of the back plate 7 of the friction pad 6 and the guide plate portion 15 of the pad spring 11.

A caliper 5 is disposed on the mount member 2 displaceably in the axial direction of the disk 1. The caliper 5 includes an inner leg portion 5A, a bridge portion 5B, and an outer leg portion 5C. The inner leg portion 5A is located in the inner side, which is one axial side of the disk 1. The bridge portion 5B extends from the inner leg portion 5A to the outer side, which is another axial side of the disk 1, so as to straddle over the outer peripheral side of the disk 1 between the individual arm portions 2A of the mount member 2. The outer leg portion 5C extends toward the inner side in the disk radial direction from an outer side of the bridge portion 5B, which corresponds to a distal end side of the bridge portion 5B, and forms a two-pronged claw portion at a distal end side thereof.

For example, a single cylinder (not illustrated) configured as a single bore is formed at the inner leg portion 5A of the caliper 5. A piston 5 (refer to FIG. 2) is slidably fittedly inserted in this cylinder. As illustrated in FIGS. 1 and 2, a pair of mount portions 5E and 5E protruding in the disk rotational direction are integrally formed at the inner leg portion 5A. These individual mount portions 5E and 5E function to slidably support the entire caliper 5 on the individual arm portions 2A of the mount member 2 via sliding pins (not illustrated).

Figure 5:
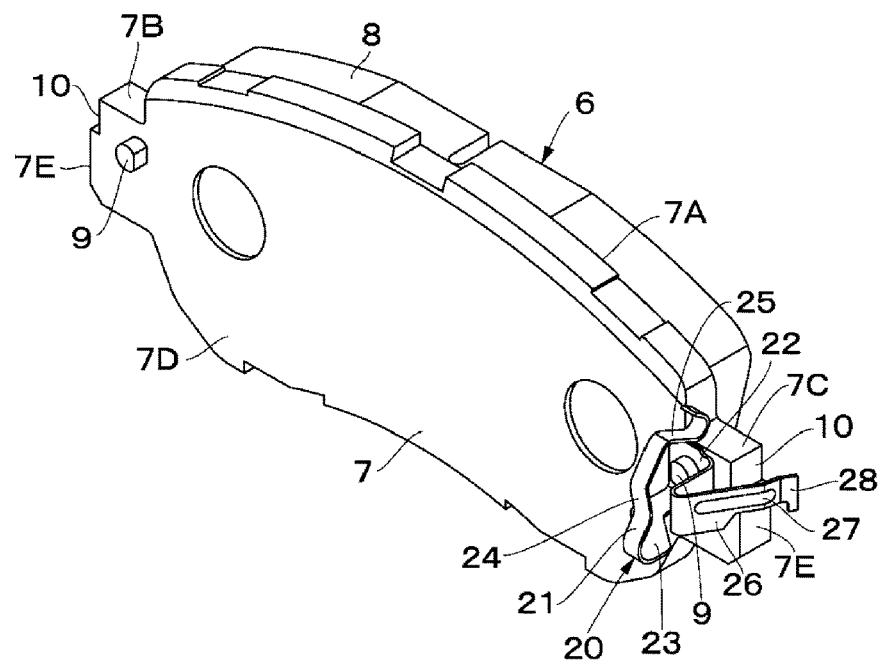
FIG. 5 is a perspective view of an outer-side friction pad and a spring structure extracted from FIG. 2, as viewed from the same direction as FIG. 2.

The inner-side and outer-side friction pads 6 and 6 are disposed so as to face both axial side surfaces of the disk 1. The individual friction pads 6 and 6 are attached to the mount member 2 displaceably in the disk axial direction, and are configured to be pressed against the both surfaces of the disk 1 by the caliper 5. As illustrated in FIG. 5 and the like, each of the friction pads 6 and 6 includes the flat back plate 7 and a lining 8. The flat back plate 7 extends in the disk rotational direction. The lining 8 is joined (fixedly attached) to a disk facing surface 7A, which is one of surfaces of the back plate 7, and serves as a friction material in frictional contact with the surface of the disk 1 (the axial side surface). The back plate 7 can be made from metal, resin, and the like.

The back plate 7 of the friction pad 6 includes the ear portions 7B and 7C as protruding portions respectively protruding at side edges on the both sides in the disk rotational direction. Each of these ear portions 7B and 7C is slidably inserted (fittedly inserted) in the pad guide 3 of the mount member 2 via each of the guide plate portions 15 of the pad springs 11, which will be described below. Then, each of the ear portions 7B and 7C functions to form a torque transmission portion configured to transmit the braking torque that the friction pad 6 receives from the disk 1 when the vehicle is braked to the pad guide 3 (the bottom wall surface 3C) of the mount member 2.

The ear portions 7B and 7C of the friction pad 6 (the back plate 7) are bilaterally symmetrically formed, and have identical shapes to each other. The ear portion 7C, which is one (the right one in FIG. 5) of the ear portions, is located on the entrance side (the leading-edge side) in the rotational direction with respect to the disk 1 rotating in the direction indicated by the arrow A when the vehicle runs forward. The ear portion 7B, which is the other (the left one in FIG. 5) of the ear portions, is located on the exit side (the trailing-edge side) in the rotational direction with respect to the disk 1. A spring structure 20 including a return spring 21 and a side push spring 26, which will be described below, is installed on the ear portion 7C, which is the one of the individual ear portions 7B and 7C that is located on the leading-edge side of the disk 1. In the present embodiment, the spring structure 20 is provided only on the leading-edge side of the disk 1, and is not provided on the trailing-edge side of the disk 1. However, the spring structure 20 may be also provided on the trailing-edge side if necessary.

Protrusions 9 and 9 are formed on the back plate 7 of the friction pad 6 at positions near proximal end sides (base sides) of the ear portions 7B and 7C, respectively. These individual protrusions 9 are formed so as to protrude from a back surface 7D (a surface opposite from the disk facing surface 7A where the lining 8 is provided, a back surface) of the back plate 7, and are formed into non-circular shapes (segments of circles) in cross-section. One of the individual protrusions 9 that is located on the leading-edge side of the disk 1 is used to position the spring structure 20, which will be described below, relative to the back plate 7. More specifically, a swaging hole 22A of the spring structure 20 is engaged with the one protrusion 9 (coupled by crimping or swaging).

Stepped portions 10 and 10 are formed on surfaces 7E of the individual ear portions 7B and 7C of the back plate 7 that face the bottom wall surfaces 3C of the pad guides 3, respectively. These individual stepped portions 10 and 10 are formed by partially cutting the facing surfaces 7E, which are end surfaces of the ear portions 7B and 7C on distal end sides (protruding sides) thereof, into L shapes. The individual stepped portions 10 are formed at radially outer positions with respect to central positions of the ear portions 7B and 7C in width directions thereof (the disk radial direction).

One of the individual stepped portions 10 that is located on the leading-edge side of the disk 1 provides a containing space for containing a part of the side push spring 26 integrally formed with the return spring 21, which will be described below. The side push spring 26 is disposed on this stepped portion 10 so as to extend in the disk axial direction. In this case, a part (a protrusion portion 28B) of a vibration portion 28, which is a distal end of the side push spring 26, enters between the disk facing surface 7A of the back plate 7 and the disk 1. In the present embodiment, the distal end of the side push spring 26 is also used for a function of detecting wear of the lining 8, whereby the distal end of the side push spring 26 extends as far as between the disk facing surface 7A and the disk 1. However, if the distal end of the side push spring 26 is not used for the function of detecting wear of the lining 8, this does not necessarily have to extend as far as between the disk facing surface 7A and the disk 1.

Pad springs 11 and 11 are installed on the arm portions 2A of the mount member 2, respectively. These individual pad springs 11 are disposed between the mount member 2 and the inner-side and outer-side friction pats 6. The pad springs 11 function to elastically support the respective friction pads 6, and smooth sliding displacements of these respective friction pads 6. Each of the pad springs 11 is formed by subjecting a metallic plate material having a spring property, such as a stainless steel plate, to bending (stamping).

Figure 8:
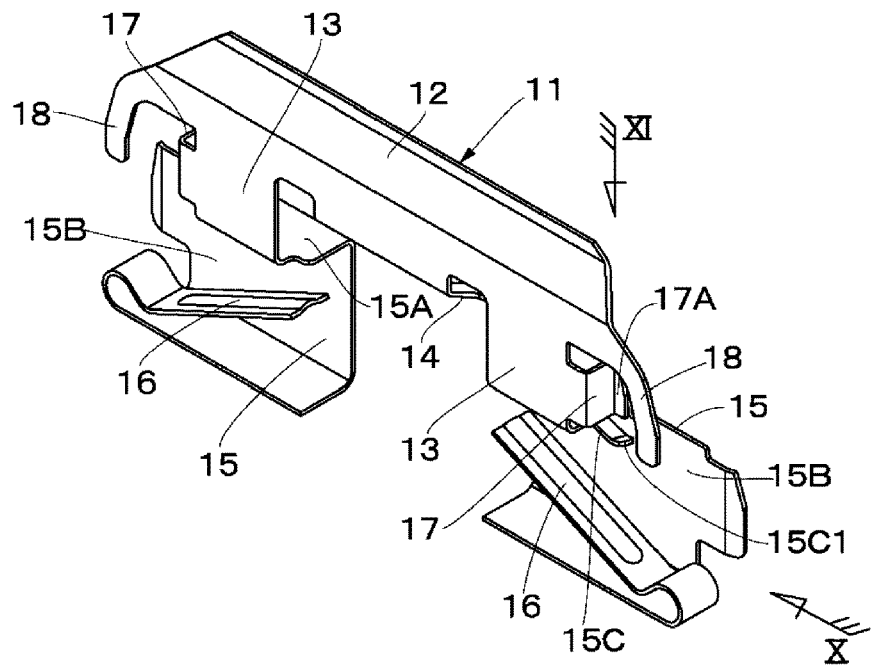
FIG. 8 is a perspective view of a pad spring on a right side in FIG. 2 (a leading-edge side) extracted from FIG. 2, as viewed from the same direction as FIG. 2.
Figure 9:
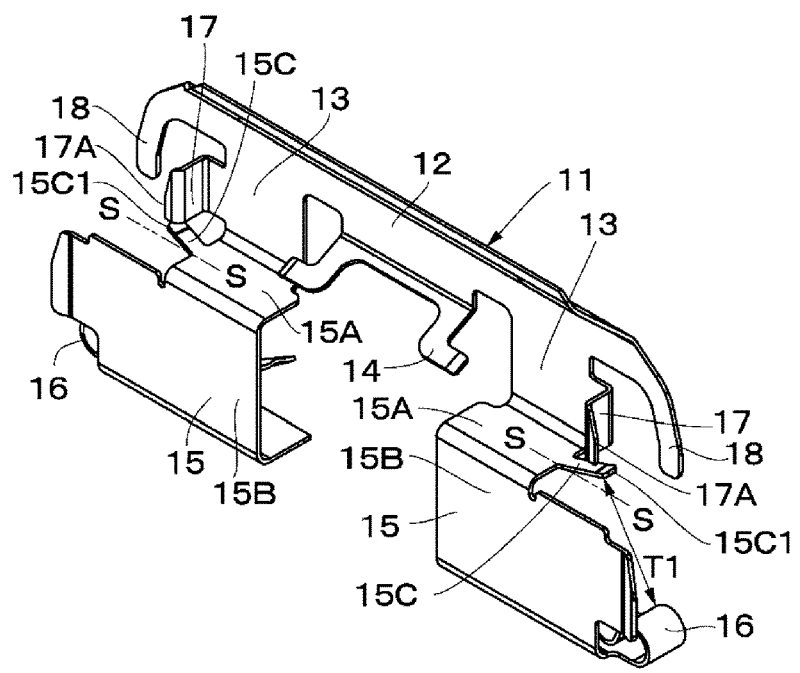
FIG. 9 is a perspective view of the pad spring illustrated in FIG. 8 as viewed from a back surface side (an upper right side in FIG. 8).

As illustrated in FIGS. 8 and 9 in detail, each of the pad springs 11 includes a connection plate portion 12, flat plate portions 13, an engagement plate portion 14, guide plate portions 15, radially biasing plate portions 16, abutment plate portions 17, and guide plate portions 18, which will be described below. These portions are integrally formed. The connection plate portion 12 is formed so as to extend in the disk axial direction while straddling over the outer peripheral side of the disk 1 to integrally connect the individual guide plate portions 15, which will be described below, in the inner side and the outer side of the disk 1. The pair of flat plate portions 13 and 13 is integrally formed on both end sides of the connection plate portion 12 in a longitudinal direction thereof so as to extend toward the inner side in the disk radial direction.

The engagement plate portion 14 is located between the pair of flat plate portions 13 and 13, and is formed integrally with the connection plate portion 12. The engagement plate portion 14 is attached to the mount member 2 so as to be engaged with the disk path portion of the arm portion 2A from the inner side in the disk radial direction. As a result, the pad spring 11 is positionally fixed relative to the arm portion 2A of the mount member 2 in the axial direction of the disk 1, and is also prevented from being displaced in the rotational direction of the disk 1.

The pair of guide plate portions 15 and 15 is formed on the both end sides of the connection plate portion 12 via the respective flat plate portions 13. The individual guide plate portions 15 are formed by bending the flat plate portions 13 from inner end sides thereof in the disk radial direction so as to conform the shapes of the pad guides 3 (substantially U shapes or substantially squared U shapes). One of the pair of the guide plate portions 15 is attached by being fitted in the inner-side pad guide 3. The other of the pair of the guide plate portions 15 is attached by being fitted in the outer-side pad guide 3. Each of the guide plate portions 15 functions to guide the back plate 7 of the friction pad 6 in the disk axial direction via the protruding ear portion 7B or 7C.

In other words, each of the guide plate portions 15 is attached so as to be able to abut against the outer wall surface 3A and the bottom wall surface 3C of the pad guide 3 (the guide plate portion 15 does not necessarily have to completely abut against the wall surfaces 3A and 3C, and the abutment here is defined to also include the guide plate portion 15 facing the wall surface(s) 3A and/or 3C with some space formed therebetween). More specifically, the guide plate portion 15 includes an outer-side portion 15A and a bottom portion 15B. The outer-side portion 15A is a portion that abuts (or faces) the outer wall surface 3A of the pad guide 3. The bottom portion 15B is a portion that abuts (or faces) the bottom wall surface 3C of the pad guide 3. Further, the guide plate portion 15 includes a guide protruding portion 15C, which extends from the outer-side portion 15A toward the outer side in the disk axial direction and is inclined obliquely toward the trailing-edge side in the disk rotational direction. In other words, the guide protruding portion 15C extends obliquely toward a central side of the friction pad 6 in the rotational direction with respect to the direction in which the friction pad 6 is displaced.

When the friction pad 6 is attached to the mount member 2 with the pad springs 11 installed thereon, the surfaces (top surfaces) of the ear portions 7B and 7C of the friction pad 6 on the outer side in the disk radial direction abut against the guide protruding portions 15C, by which the guide protruding portions 15C function to guide these ear portions 7B and 7C in the disk axial direction, respectively. More specifically, when the friction pad 6 is attached to the mount member 2 with the pad springs 11 installed thereon, the friction pad 6 is attached to the mount member 2 with the spring structure 20, which will be described below, installed thereon as illustrated in FIG. 5. At this time, the side push spring 26 of the spring structure 20 should be elastically deformed by being brought into abutment with the bottom portion 15B of the guide plate portion 15.

Figure 12:
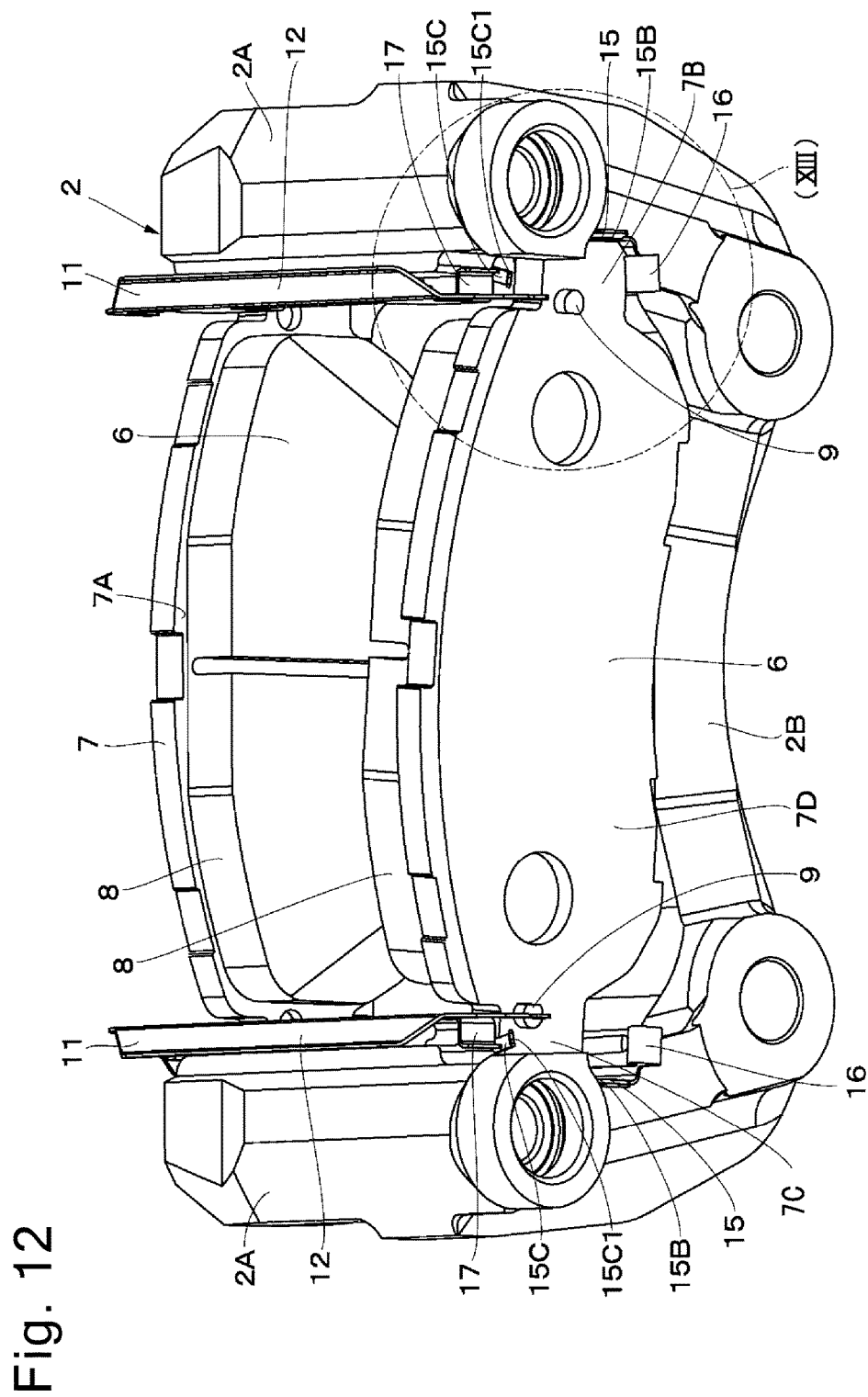
FIG. 12 is a perspective view of the friction pads, the pad springs, and a mount member in a state that the friction pad is being attached to the mount member.
Figure 13:
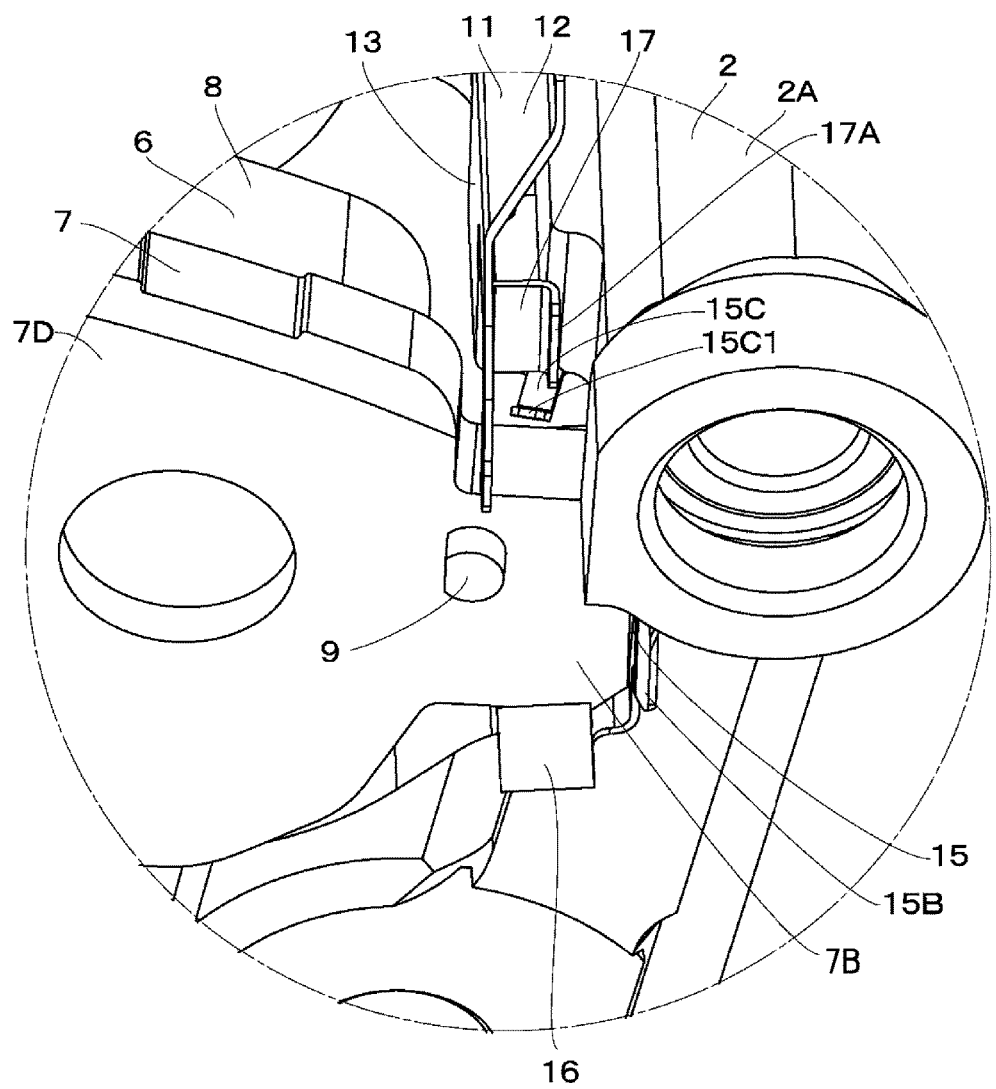
FIG. 13 is an enlarged view of a portion (XIII) illustrated in FIG. 12.

Therefore, as illustrated in FIGS. 12 and 13, when the friction pad 6 is attached to the mount member 2, the friction pad 6 is inclined with respect to the disk 1. More specifically, the friction pad 6 is inclined in such a manner that the ear portion 7C on the leading-edge side of the disk 1, which corresponds to one side where the spring structure 20 is provided, is positioned on the inner side in the disk axial direction with respect to the ear portion 7B on the trailing-edge side. FIGS. 12 and 13 illustrate the friction pad 6 with the spring structure 20 removed therefrom so as to make the inclination of the friction pad 6 clearly understandable. However, when the friction pad 6 is attached actually, the spring structure 20 is installed on the protrusion 9 on the leading-edge side of the friction pad 6 as illustrated in FIG. 5.

Figure 10:
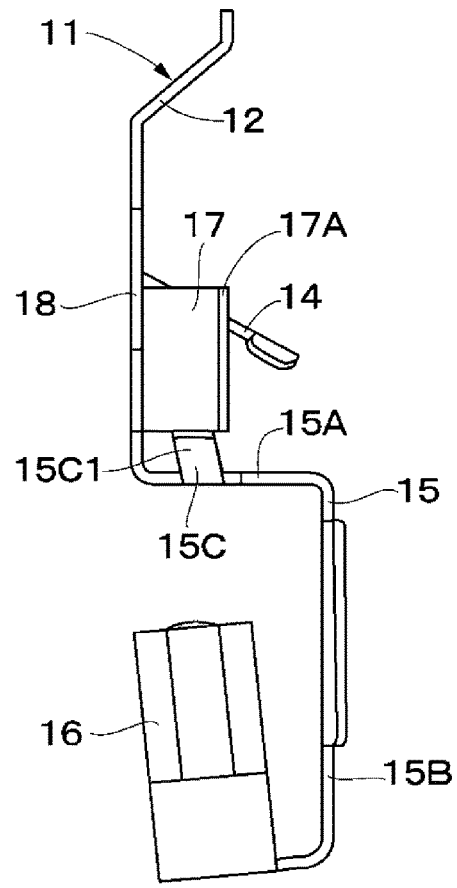
FIG. 10 is a perspective view of the pad spring illustrated in FIG. 8 as viewed from a direction indicated by an arrow X.
Figure 11:
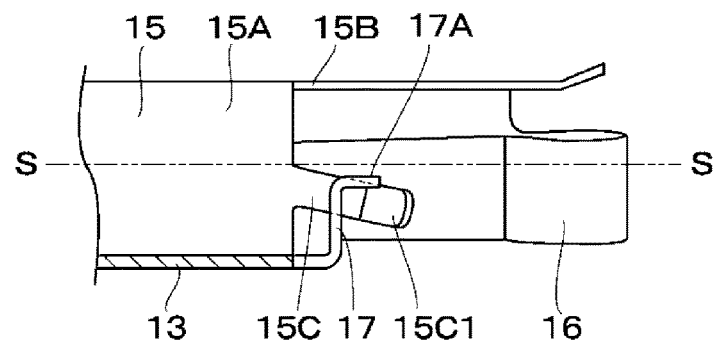
FIG. 11 is a plan view of main portions that depicts the pad spring illustrated in FIG. 8 as viewed from a direction indicated by an arrow XI.

Then, the guide protruding portion 15C is inclined toward the trailing-edge side in the disk rotational direction in compliance with the inclined orientation of the friction pad 6 because the friction pad 6 is attached while being kept inclined. More specifically, as illustrated in FIG. 11, the guide protruding portion 15C is inclined (forms an angle) toward the trailing-edge side in the disk rotational direction (one side toward which the side push spring 26 pushes the friction pad 6) with respect to an axis S-S extending in the disk axial direction (the direction in which the friction pad 6 is displaced by the caliper 5; the displacement direction of the friction pad 6). In other words, the guide protruding portion 15C extends obliquely toward the central side of the friction pad 6 in the rotational direction with respect to the displacement direction of the friction pad 6. Further, as illustrated in FIG. 10, the guide protruding portion 15C (a distal side thereof) is also inclined toward the outer side in the disk radial direction (forming the bent portion 15C1) in addition to being inclined in the disk rotational direction. In other words, the guide protruding portion 15C also extends obliquely toward the outer side in the disk radial direction with respect to the displacement direction of the friction pad 6.

In such a state that the ear portion 7C, which is one of the pair of ear portions 7B and 7C (protruding portions) of the friction pad 6, is disposed at one of the guide plate portions 15, the guide protruding portion 15C extends in a same direction as a direction in which the ear portion 7B, which is the other of the pair of ear portions 7B and 7C (the protruding portions) of the friction pad 6, is being inserted when the other ear portion 7B is inserted in the other guide plate portion 15. By this configuration, when the friction pad 6 is attached to the mount member 2 with the pad springs 11 installed thereon, the top surface (the surface on the outer side in the disk radial direction) of the ear portion 7C on the leading-edge side of the fiction pad 6 can be smoothly guided along the guide protruding portion 15C in a direction in which this ear portion 7C advances. As a result, efficiency of attaching the friction pad 6 can be improved.

More specifically, the guide protruding portion 15C extends in the same direction as the direction in which the ear portion 7B on the trailing-edge side of the friction pad 6 is being attached when the friction pad 6 is attached to the mount member 2 with the side push spring 26 of the spring structure 20 elastically deformed. By this configuration, when the friction pad 6 with the spring structure 20 installed thereon is attached to the mount member 2 with the pad springs 11 installed thereon, the top surface (the surface on the outer side in the disk radial direction) of the ear portion 7B on the trailing-edge side of the friction pad 6 can be smoothly guided along the guide protruding portion 15C in the direction in which this ear portion 7B advances. As a result, the efficiency of attaching the friction pad 6 can be improved.

Further, the distal end side of the guide protrusion portion 15C is bent toward the outer side in the disk radial direction. In other words, the bent portion 15C1 bent toward the outer side in the disk radial direction is formed on the distal end side of the guide protrusion portion 15C. This can increase (widen) a dimension of an opening T1 (refer to FIG. 9) in which the ear portion 7B or 7C is inserted when the friction pad 6 is attached. As a result, it is possible to ensure (enhance) displaceable flexibility of the friction pad 6 in the disk radial direction when the ear portion 7B or 7C of the friction pad 6 is inserted in the guide plate portion 15, and this can also contribute to the improvement of the efficiency of attaching the friction pad 6.

The radially biasing plate portions 16 are formed integrally with inner sides of the respective guide plate portions 15 in the disk radial direction. Each of the radially biasing plate portions 16 extends in the disk axial direction from the inner side of the guide plate portion 15 in the disk radial direction, and is turned arcuately by approximately 360 degrees. A distal end thereof extends to reach an inner side of the ear portion 7B or 7C in the disk radial direction so as to abut against the ear portion 7B or 7C of each of the friction pads 6 (the back plates 7). Each of the radially biasing plate portions 16 is in elastic abutment with the ear portion 7B or 7C of each of the friction pads 6 (the back plates 7) in each of the pad guides 3 of the mount member 2, and biases the back plate 7 of each of the friction pads 6 toward the outer side in the disk radial direction. As a result, each of the radially biasing plate portions 16 can prevent or reduce rattling of each of the friction pads 6, and smoothly guide the friction pad 6 along the guide plate portion 15 in the disk axial direction when the brake operation is performed.

The abutment plate portions 17 are provided on outer sides of the respective flat plate portions 13 in the disk axial direction, and are integrally formed so as to be bent from the respective flat plate portions 13 by approximately 90 degrees to extend in the disk rotational direction. Each of the abutment plate portions 17 serves as a receiving seat surface in abutment with a distal end side (an abutment portion 25) of the return spring 21, which will be described below, in an elastically deformed state. In other words, the present embodiment is configured in such a manner that the return spring 21 is in abutment with the mount member 2 side via the abutment plate portion 17 serving as a metallic abutment plate. In this case, the abutment plate portion 17 is configured to extend from the pad spring 11. Further, on a distal end side of the abutment plate portion 17, there is provided a distal end guide portion 17A formed by obliquely or perpendicularly bending the abutment plate portion 17 in a direction away from the disk 1. The distal end guide portion 17A functions to regulate a displacement of the distal end side of the return spring 21, more specifically, the abutment portion 25 of the return spring 21 in a direction away from the friction pad 6 (toward the trailing-edge side) in the disk rotational direction.

The guide plate portions 18 are provided on the both end sides of the connection plate portion 12 in the longitudinal direction (or on the outer sides of the respective flat plate portions 13 in the disk axial direction and outer sides of the abutment plate portions 17 in the disk radial direction). Each of the guide plate portions 18 extends from the connection plate portion 12 (or each of the flat plate portions 13) in the direction away from the disk 1 (toward the outer side) in the disk axial direction, and is formed into a substantially one-fourth circular arc curved toward the inner side in the disk radial direction as being separated farther away from the disk 1. The guide plate portion 18 functions to support a side surface of an intermediate portion of the return spring 21, more specifically, a side surface of second extension portion 24 of the return spring 21. Therefore, the guide plate portion 18 extends in the disk axial direction on same plane as the flat plate portion 13, and extends from the outer side to the inner side in the disk radial direction (while being curved) so as to conform a portion where the flat plate portion 13 and the abutment plate portion 17 are connected to each other (a portion where the flat plate portion 13 and the abutment plat portion 17 are bent by approximately 90 degrees from each other).

As a result, the guide plate portion 18 is configured to regulate a displacement of the distal end side of the return spring 21, i.e., a portion extending from the second extension portion 24 to the abutment portion 25 toward the friction pad 6 side in the disk rotational direction. In other words, the displacement of the distal end side of the return spring 21 away from the friction pad 6 in the disk rotational direction is regulated by the distal end guide portion 17A of the abutment plate portion 17, and the displacement of the distal end side of the return spring 21 toward the friction pad 6 opposite therefrom is regulated by the guide plate portion 18. As a result, the distal end side of the return spring 21 can be brought into abutment with a desired position (the abutment plate portion 17).

The present embodiment has been described based on the example in which the guide plate portion 18 is formed into a circular arc. However, the present invention is not limited thereto. For example, the guide plate portion 18 may be configured to include an axially extending portion, which linearly extends from the connection plate portion 12 (or each of the flat plate portions 13) in the disk axial direction, and a radially extending portion, which extends from a distal end of the axially extending portion toward the inner side in the disk radial direction, i.e., the guide plate portion 18 may be formed into a substantially L shape as a whole. In other words, the guide plate portion 18 can be configured to extend toward a support target portion of the side surface of the intermediate portion of the return spring 21.

Further, the present embodiment is configured in such a manner that the abutment plate portions 17 and the guide plate portions 18 are provided on both of the pad springs 11 on the leading-edge side and the trailing-edge side. However, the present embodiment may be configured in such a manner that the abutment plate portions 17 and the guide plate portions 18 are provided on only the pad spring 11 on the leading-edge side where the return spring 21 is installed. In other words, the abutment plate portions 17 and the guide plate portions 18 can be omitted from the pad spring 11 on the trailing-edge side where the return spring 21 is not installed. However, it is preferable that the disk brake is configured in such a manner that the pad spring 11 with the abutment plate portions 17 and the guide plate portions 18 formed thereon is installed on both the leading-edge side and the trailing-edge side, like the present embodiment, to allow common parts to be used as the pad springs 11 on the leading-edge side and the trailing-edge side, thus facilitating an assembling process.

Next, the spring structure 21 installed on the friction pad 6 will be described. The spring structure 21 is configured in such a manner that the return spring 21 biasing the friction pad 6 in a return direction for displacing the friction pad 6 away from the disk 1, and the side push spring 26 as a rotational direction biasing member biasing the friction pad 6 in the disk rotational direction (toward the trailing-edge side therein) are formed integrally with each other. Further, the side push spring 26 also plays a role as the friction notification member that notifies a driver or the like that it is time to replace the friction pad 6 (the lining 8 has been worn to reach a wear limit).

More specifically, the spring structure 20 is formed as a metallic integrally formed spring member having three functions as a whole, by the return spring 21 having the function of returning the friction pad 6 to a return position where the friction pad 6 is separated from the disk 1 (a return function), and the side push spring 26 having two functions, the function of pushing the friction pad 6 in the disk rotational direction (toward the trailing-edge side therein) (a side push function) and the function of warning the driver about the wear limit of the lining 8 (a wear detection function). In the present embodiment, the spring structure is configured as the metallic integrally formed spring member having all of the three functions, which can reduce the cost and improve the efficiency of the attachment. However, the present invention is not limited thereto, and may be configured to include three members individually separately having these functions, or may be configured to include the side push spring having only the side push function without having the return function and the wear detection function).

The spring structure 20 is mounted on the side edge portion (the ear portion 7C) located on the disk leading-edge side when the vehicle runs forward, which is one of the individual side edge portions (the ear portions 7B and 7C) of the back plate 7 forming each of the inner-side and outer-side friction pads 6. The spring structure 20 includes the return spring 21 and the side pushing spring 26, which are integrally formed by bending a spring material shaped from a metallic plate having a spring property, such as a stainless steel plate, with use of a method such as stamping. The inner-side spring structure 20 and the outer-side spring structure 20 are identically configured except for such a difference that they are symmetrically (plane-symmetrically) formed about the disk 1. In the following description, the spring structure 20 will be described mainly focusing on the outer-side spring structure 20.

The return spring 21 forming the spring structure 20 is disposed between the friction pad 6 and the mount member 2, more specifically, between the ear portion 7C on the disk leading-edge side and the pad spring 11 disposed on the mount member 2. The return spring 21 functions to bias the friction pad 6 in the return direction for separating the friction pad 6 from the disk 1, and is formed by bending the metallic spring material together with the side push spring 26.

The return spring 21 is configured in such a manner that a proximal end side thereof is fixed to the back plate 7 of the friction pad 6, and the distal end side thereof is in elastic abutment with the mount member 2 side on the outer side in the disk radial direction with respect to the proximal end side thereof. Therefore, the return spring 21 includes a fixation portion 22, a first extension portion 23, the second extension portion 24, and the abutment portion 25.

The fixation portion 22 as a flat plate is configured to be positionally fixed while being also positioned in the rotational direction by being fixedly crimped or swaged to the protrusion 9 on the ear portion 7C side of the friction pad 6 (the back plate 7). Therefore, the non-circular swaging hole 22A is pierced through a substantially central position of the fixation portion 22. The protrusion 9 of the ear portion 7C is fittedly inserted in this hole 22A. The present embodiment is described based on the example in which the spring structure 20 is fixed by swaging or crimping. However, the present invention is not limited thereto. The spring structure 20 may be fixed by being clamped to each of the ear portions 7B and 7C of the back plate 7 of the friction pad 6. The fixation method can be arbitrarily designed.

The first extension portion 23 is formed by bending the fixation portion 22 in an L-shaped manner as if the first extension portion 23 is perpendicularly erected from the fixation portion 22, and a distal end side thereof extends in a direction perpendicularly separated from the surface of the disk 1. More specifically, a proximal end side of the first extension portion 23 extends in the disk axial direction as an erected portion 23A, and a portion from an intermediate position to a distal end side of the first extension portion 23 extends obliquely with respect to the disk axial direction, more specifically, obliquely toward the bottom wall surface 3C of the pad guide 3 of the mount member 2, forming an inclined portion 23B.

The second extension portion 24 is bent at an acute angle or a right angle (approximately 45 to 90 degrees)) from the distal end side of the first extension portion 23 outwardly in the disk radial direction toward the abutment plate portion 17 of the pad spring 11, and extends outwardly in the disk radial direction toward the abutment plate portion 17 of the pad spring 11. The abutment portion 25 is substantially perpendicularly (70 to 90 degrees) bent from a distal end side of the second extension portion 24 toward the abutment plate portion 17 of the pad spring 11, and includes a folded portion 25A formed by folding a distal end side thereof in a U-shaped manner. This folded portion 25A is in elastic abutment with the abutment plate portion 17 of the pad spring 11. As a result, the return spring 21 is configured in such a manner that the distal end side (the abutment portion 25) thereof is in elastic abutment with the mount member 2 side (the pad spring 11) on the outer side in the disk radial direction with respect to the proximal end side (the fixation portion 22).

Now, the first extension portion 23 includes the inclined portion 23B at the distal end side from the intermediate position thereof, which extends obliquely with respect to the erected portion 23A on the proximal end side. As a result, the proximal end side of the return spring 21 (the portion where the fixation portion 22 and the erected portion 23A are connected to each other) is offset (shift) from the distal end side (the abutment portion 25) in the tangential direction of the disk 1, thereby being prevented from interfering with the side push spring 26, which will be described below, and adjusting a spring force of the return spring 21.

Further, the second extension portion 24 is bent from the distal end of the first extension portion 23 in the disk radial direction at the right angle or the acute angle, and is formed so as to extend toward the abutment plate portion 17 of the pad spring 11. As a result, the second extension portion 24 is formed so as to extend outside the side push spring 26 in the disk axial direction, thereby being prevented from interfering with the side push spring 26. Further, the abutment portion 25 is bent from the distal end of the second extension portion 24 in the substantially L-shaped manner in the disk axial direction. The folded portion 25A, which is formed by folding the distal end side of the abutment portion 25 in the U-shaped manner, is in elastic abutment with the abutment plate portion 17 of the pad spring 11 with line contact made therebetween.

Due to this configuration, the return spring 21 constantly biases the friction pad 6 (the back plate 7) in the return direction for separating the friction pad 6 from the disk 1, and therefore can stably return the friction pad 6 toward the return position (an initial position or a waiting position), for example, when the brake operation on the vehicle is released. In this case, the abutment portion 25 on the distal end side of the return spring 21 is in elastic abutment with the abutment plate portion 17 of the pad spring 11, which corresponds to the mount member side, outside the fixation portion 22 on the proximal end side of the return spring 21 in the disk radial direction. As a result, the friction pad 6 can tend to have such a posture at the return position that the radially outer side thereof is inclined farther away from the disk 1 than the radially inner side thereof, i.e., the friction pad 6 is opened outwardly (upwardly). The return spring 21 does not necessarily have to exert a biasing force that achieves the outwardly (upwardly) opened posture, as long as the return spring 21 can prevent or reduce such a tendency that the friction pad 6 has an inwardly (downwardly) opened posture at the above-described return position.

Further, in the present embodiment, the side surface of the second extension portion 24, which corresponds to the side surface of the intermediate portion of the return spring 21, is located close to the guide plate portion 18 of the pad spring 11 while facing it, with the spring structure 20 (the return spring 21) installed on the mount member 2 together with the friction pad 6. In other words, when the return spring 21 is installed on the mount member 2 together with the friction pad 6, the side surface of the second extension portion 24 is supported (guided) by the guide plate portion 18, which regulates the displacements of the second extension portion 24 and the abutment portion 25 toward the friction pad 6 in the disk rotational direction. As a result, after completion of the installation, the abutment position of the abutment portion 25 of the return spring 21 is regulated so as to be located at the abutment plate portion 17 of the pad spring 11. Further, for example, even when the distal end side of the return spring 21 is about to be offset from the abutment plate portion 17 due to application of an external force to the return spring 21 from a hit or the like of a flying stone or the like when the vehicle is running on an unpaved road or the like, this offset can be also prevented or reduced because the side surface of the intermediate portion (the side surface of the second extension portion 24) of the return spring 21 is supported by the guide plate portion 18 of the pad spring 11.

Next, the side push spring 26 as the rotational direction biasing member, which is formed integrally with the return spring 21, will be described.

The side push spring 26 forms the spring structure 20 together with the return spring 21. The side push spring 26 is disposed between the ear portion 7C located on the disk leading-edge side when the vehicle runs forward, and the bottom surface 3C of the pad guide 3 of the mount member 2, which faces this ear portion 7C. The side push spring 26 has the push function, which biases the pad guide 3 to push the friction pad 6 toward the trailing-edge side of the disk 1 in the disk rotational direction. Further, in addition thereto, the side push spring 26 also has the function of warning the driver or the like about the fact that the lining 8 has reached the wear limit by generating a noise when the distal end of the side push spring 26 disposed between the back plate 7 of the friction pad 6 and the disk 1, i.e., the vibration portion 28 (the distal end 28A thereof) is in contact with the disk 1.

The side push spring 26 generally includes the fixation portion 22, which is shared with the return spring 21, a push portion 27, and the vibration portion 28. These fixation portion 22, push portion 27, and vibration portion 28 are integrally formed. The push portion 27 is formed by bending the plate from the fixation portion 22 so as to define a U shape in cross-section on the back surface side of the back plate 7. The push portion 27 includes a bent piece portion 27A, a folded portion 27B, and an abutment portion 27C.

The bent piece portion 27A is formed by bending the plate in an L-shaped manner so as to be erected perpendicularly from the fixation portion 22 at a position separated from the first extension portion 23 of the return spring 21. A distal end side of the bent piece portion 27A extends in the direction perpendicularly away from the surface of the disk 1. The folded portion 27B is formed by folding the distal end side of the bent piece portion 27A in a substantially U-shaped manner, and extends reversely in the disk axial direction. The abutment portion 27C is connected to a distal end side of the folded portion 27B, and extends from this distal end side toward the disk facing surface 7A of the back plate 7 toward the disk 1.

The abutment portion 27C includes a tapered portion 27C1 and a constant width portion 27C2. The tapered portion 27C1 has a width dimension reducing toward the disk 1. The constant width portion 27C2 extends toward the disk 1 without a change in the width dimension (constant). Further, the abutment portion 27C includes a protrusion portion 27C3 extending across from the tapered portion 27C1 to the constant width portion 27C2.

The abutment portion 27C (the protrusion portion 27C3) is in abutment (elastic contact) with the bottom wall surface 3C of the pad guide 3 of the mount member 2 via the guide plate portion 15 of the pad spring 11 while being elastically deformed. The abutment portion 27C is in elastic contact with the bottom wall surface 3C via the pad spring 11, by which the push portion 27 of the side push spring 26 biases the friction pad 6 in the disk rotational direction, more specifically, toward the trailing-edge side of the disk 1.

The vibration portion 28 forming the side push spring 26 extends from a distal end side of the push portion (the abutment portion 27C) toward the disk 1. The vibration portion 28 functions to generate the noise (an abnormal noise) with use of a vibration of the distal end 28A thereof from contact with the axial side surface (the surface) of the disk 1 when the lining 8 of the friction pad 6 has been worn to reach a predetermined portion (the wear limit) set in advance.

Figure 6:
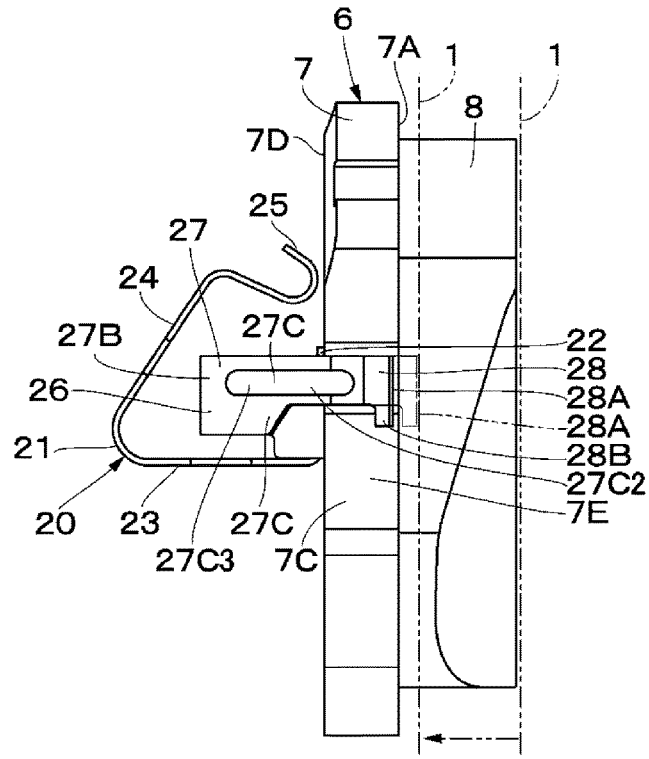
FIG. 6 is a side view of the outer-side friction pad and the spring structure as viewed from a right side in FIG. 5.
Figure 7:
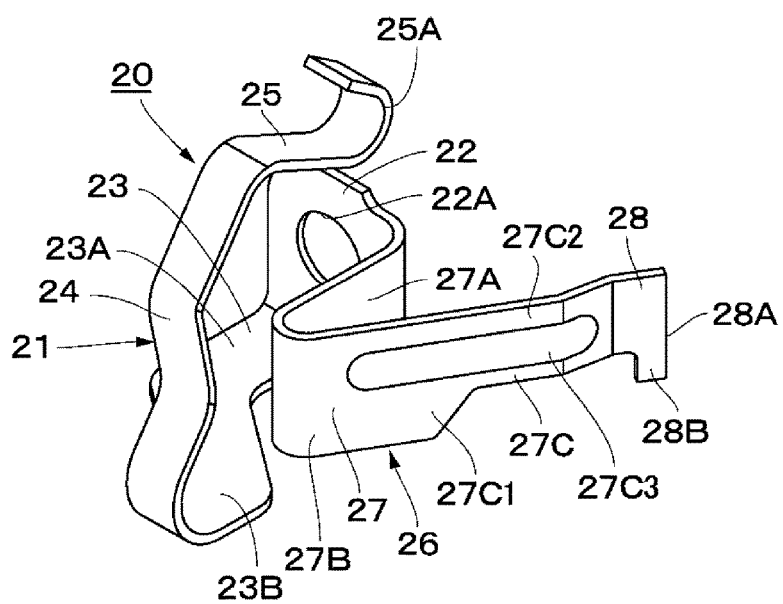
FIG. 7 is a perspective view of the spring structure extracted from FIG. 5, as viewed from the same direction as FIG. 5.

More specifically, as illustrated in FIG. 6, when the disk facing surface 7A of the back plate 7 while the vehicle is braked is displaced closer to the disk 1 due to wear of the lining 8, the distal end 28A of the vibration portion 28 contacts the side surface of the disk 1 to vibrate, thereby generating the noise. As a result, the warning can be issued to the driver or the like to indicate that it is time to replace the friction pad 6 (the lining 8 has reached the wear limit). In FIG. 6, a solid line indicates the side push spring 26 in a free state before the friction pad 6 and the spring structure 20 are attached to the mount member 2 (without the spring structure 20 elastically deformed), and a long dashed double-short dashed line indicates the side push spring 26 with the spring structure 20 elastically deformed after the installation.

The disk brake according to the present embodiment is configured in the above-described manner, and an operation thereof will be described next.

First, when the brake operation is performed on the vehicle, a brake hydraulic pressure is supplied into the inner leg portion 5A (the cylinder) of the caliper 5, thereby slidably displacing the piston 5D toward the disk 1. As a result, the inner-side friction pad 6 is pressed against one side surface of the disk 1. Then, at this time, since the caliper 5 receives a pressing reaction force from the disk 1, the entire caliper 5 is slidably displaced toward the inner side relative to the arm portions 2A of the mount member 2, whereby the outer leg portion 5C presses the outer-side friction pad 6 against the other side surface of the disk 1.

Figure 2:
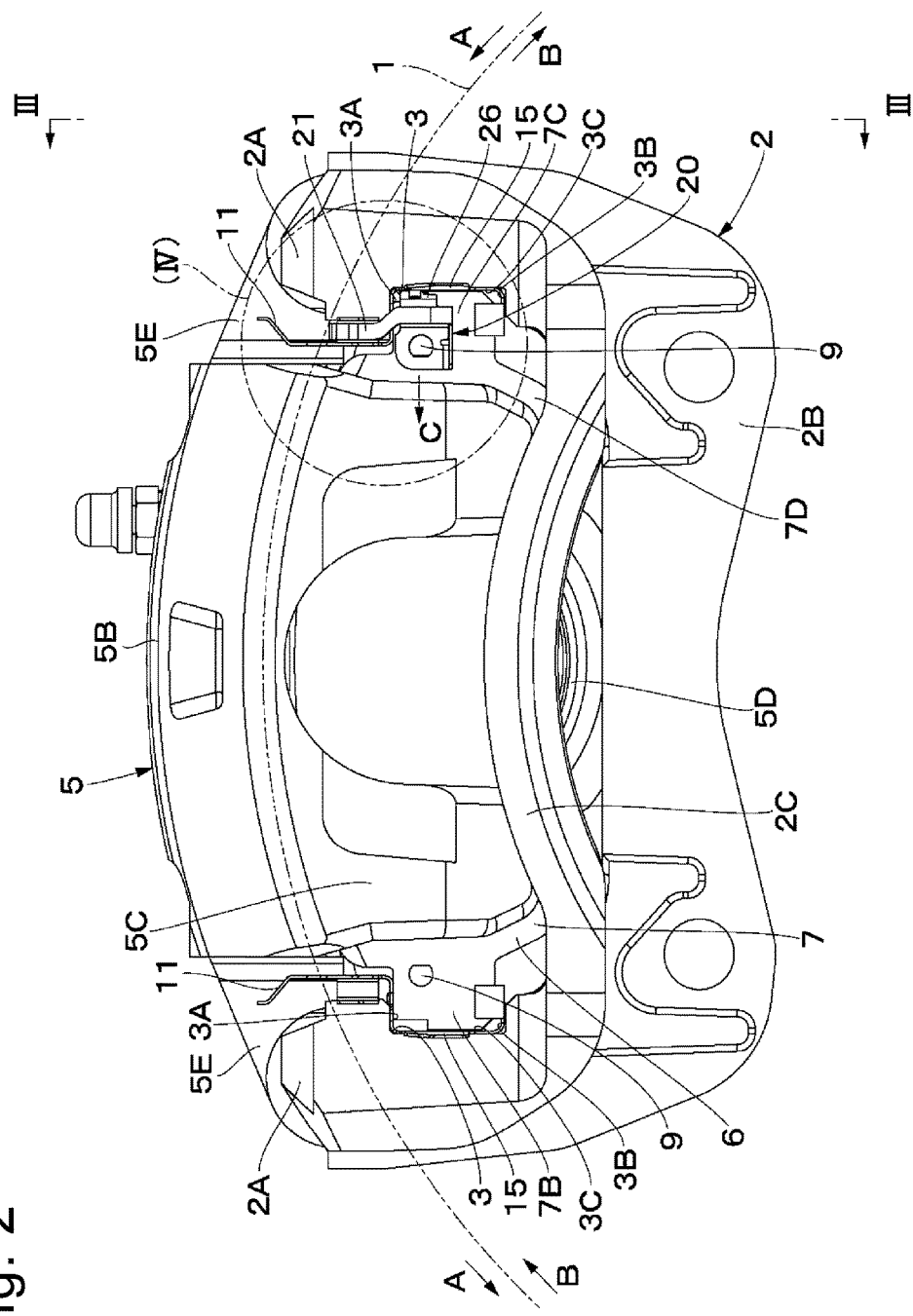
FIG. 2 is a front view of the disk brake as viewed from an outer side.
Figure 3:
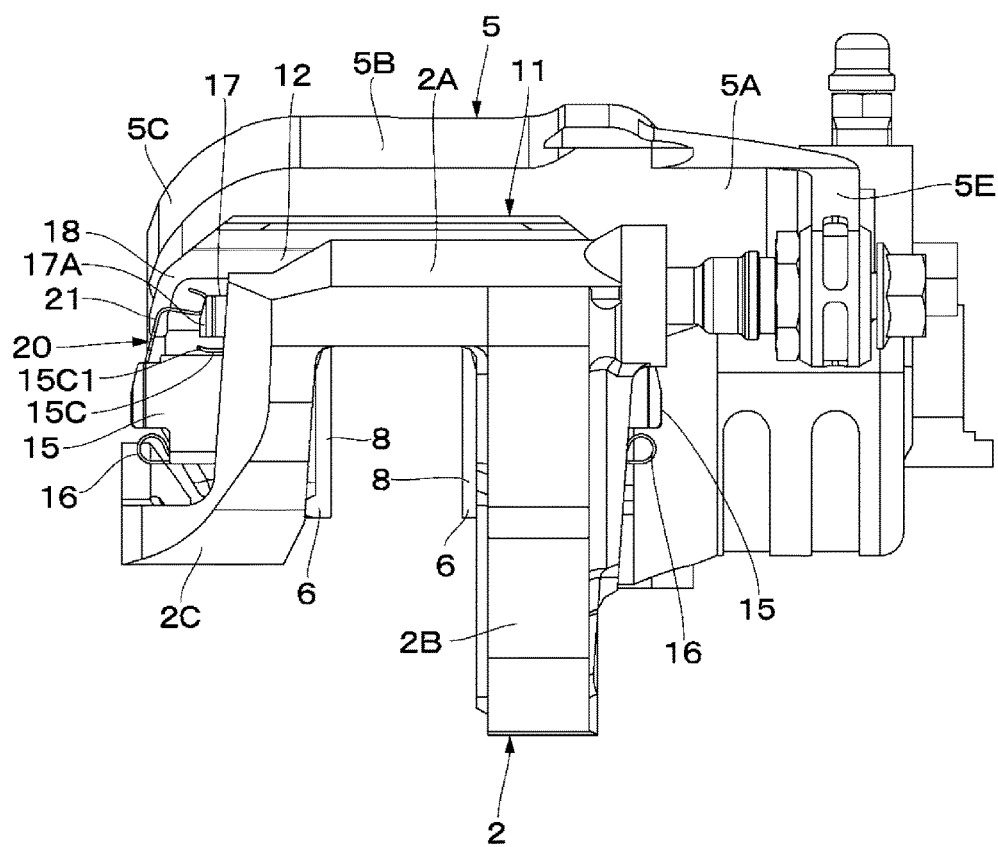
FIG. 3 is a side view of the disk brake as viewed from a direction indicated by arrows III and III illustrated in FIG. 2.
Figure 4:
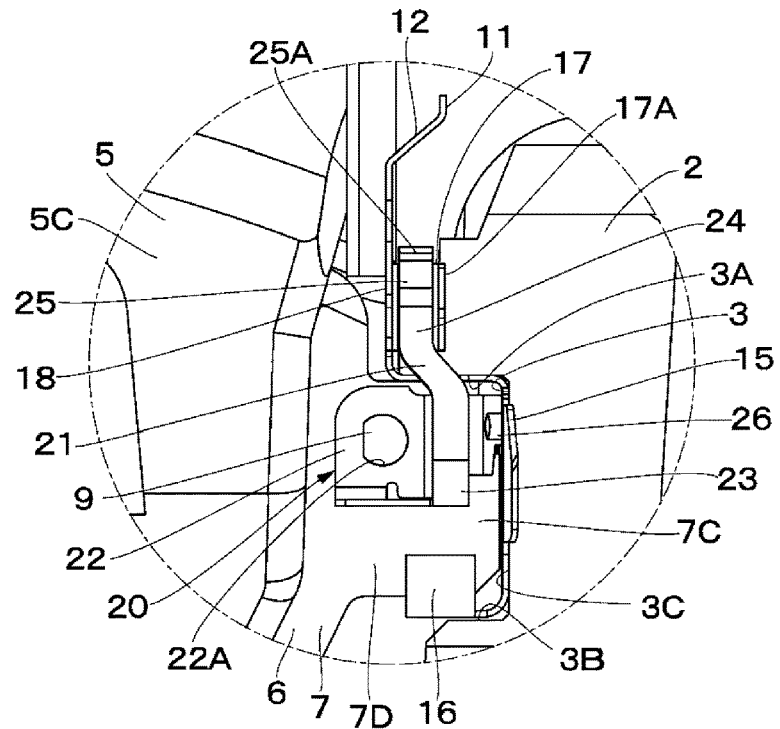
FIG. 4 is an enlarged view of a portion (IV) illustrated in FIG. 2.

As a result, the inner-side and outer-side friction pads 6 can strongly sandwich the disk 1 rotating in, for example, the direction indicated by the arrow A in FIG. 2 (when the vehicle runs forward) therebetween from both of the axial sides, thereby succeeding in providing a braking force to the brake 1. Then, when the brake operation is released, a stop of the hydraulic supply into the piston 5D causes the inner-side and outer-side friction pads 6 to be separated from the disk 1, thereby returning the vehicle to a non-braked state again. At this time, the inner-side and outer-side friction pads 6 are stably returned to the return positions (the initial positions or the waiting positions) separated from the disk 1 by the return springs 21.

When the brake operation is performed or released (when the vehicle is not braked) in this manner, the ear portions 7C, which are the ones of the ear portions 7B and 7C of the friction pads 6 that are located on the leading-edge side of the disk 1, are biased by the push portions 27 of the side push springs 26 in a direction indicated by an arrow C in FIG. 2, and the friction pads 6 are constantly biased by weak forces toward the trailing-edge side of the disk 1 (in the direction indicated by the arrow A in FIG. 2). Then, the ear portions 7B located on the trailing-edge side of the disk 1 are elastically pressed by the biasing forces at this time against the bottom wall surfaces 3C of the pad guides 3 via the guide plate portions 15 of the pad spring 11.

Therefore, the rattling of the friction pads 6 in the disk rotational direction due to a vibration or the like when the vehicle is running can be regulated by the side push springs 26 disposed between the ear portions 7C and the bottom wall surfaces 3C on the leading-edge side of the disk 1. Then, when the vehicle is braked while being running forward, the braking torques that the friction pads 6 receive from the disk (rotational torques in the direction indicated by the arrow A) can be borne by the arm portion 2A (the bottom wall surfaces 3C of the pad guides 3) on the trailing-edge side.

As a result, the ear portions 7B of the friction pads 6 located on the trailing-edge side of the disk 1 continue abutting against the bottom wall surfaces 3C of the pad guides 3 via the guide plate portions 15. Further, before the brake operation is performed, the ear portions 7B on the trailing-edge side are in abutment with the guide plate portions 15 due to the biasing forces of the push portions 27 of the side push springs 26, without any clearance (space) generated therebetween. Therefore, the displacements of the friction pads 6 and the generation of an abnormal noise (a rattling noise) due to the braking torques can be prevented or reduced.

Further, the ear portions 7B and 7C of the friction pads 6 are slidably fittedly inserted in the pad guides 3 and 3 positioned on the trailing-edge side and the leading-edge side of the disk 1 via the guide plate portions 15 of the pad springs 11, respectively, and are biased by the respective radially biasing plate portions 16 toward the outer side in the radial direction of the disk 1. As a result, the ear portions 7B and 7C of the friction pads 6 can be elastically pressed toward the outer-side portions 15A (the surfaces on the outer side in the disk radial direction) of the guide plate portions 15.

Therefore, the rattling of the friction pads 6 in the radial direction of the disk 1 due to the vibration or the like when the vehicle is running can be prevented or reduced with the aid of the radially biasing plate portions 16 of the pad springs 11. Then, when the brake operation is performed, the friction pads 6 on the inner side and the outer side can be smoothly guided along the guide plate portions 15 in the axial direction of the disk 1 while the ear portions 7B and 7C of the friction pads 6 are kept in the state in sliding contact with the outer-side portion 15A sides of the guide plate portions 15.

When the disk brake is assembled or the fiction pad 6 is replaced, with the spring structure 20 (the return spring 21 and the side push spring 26) installed on the protrusion 9 on the ear portion 7C side of the friction pad 6, this friction pad 6 is attached to the mount member 2 with the pad springs 11 installed thereon. At this time, the side push spring 26 of the spring structure 20 is elastically deformed between the ear portion 7C of the friction pad 6 and the guide plate portion 15 of the pad spring 11, and the ear portion 7C is also fittedly inserted (inserted) in the pad guide 3 with the side push spring 26 kept in this state. In this case, if the guide protruding portion 15C of the pad spring 11 extends, for example, in a straight line toward the outer side in the disk axial direction (in parallel with the axis S-S illustrated in FIG. 11), the top surface (the surface on the outer side in the disk radial direction) of the ear portion 7C and the guide protruding portion 15C may be brought into point contact with each other. As a result, the work efficiency at the time of the attachment may be deteriorated.

Therefore, in the present embodiment, the guide protruding portion 15C, i.e., the guide protruding portion 15C extends obliquely toward the central side of the friction pad 6 in the rotational direction with respect to the displacement direction of the friction pad 6. The guide protruding portion 15C extends to the outer side in the disk axial direction, and is also inclined in the disk rotational direction. Therefore, when the friction pad 6 with the side push spring 26 installed thereto is attached to the mount member 2 with the pad springs 11 installed thereon, the top surface of the ear portion 7C of the friction pad 6 can be guided along the inclined guide protruding portion 15C in the direction in which this ear portion 7C advances. At this time, the top surface of the ear portion 7C of the friction pad 6 and the guide protruding portion 15C can be brought into abutment with each other approximately orthogonally. Further, inclining the guide protruding portion 15C can elongate the guide protruding portion 15C compared to a configuration in which the guide protruding portion 15C is not inclined, even when dimensions in the disk axial direction are set to the same value. Therefore, the ear portion 7C of the friction pad 6 can reach the guide protruding portion 15C earlier when being attached. This can smooth the work of inserting the ear portion 7C of the friction pad 6 into the pad guide 3 (the guide plate portion 15 of the pad spring 11), thereby improving the work efficiency when the friction pad 6 is attached to the mount member 2.

In the present embodiment, the guide protruding portion 15C is inclined in the disk rotational direction, and is also inclined toward the outer side in the disk radial direction. In other words, the guide plate protruding portion 15C also extends obliquely toward the outer side in the disk radial direction with respect to the displacement direction of the friction pad 6. Therefore, the guide protruding portion 15C can guide the ear portion 7C of the friction pad 6 from the outer side toward the inner side in the disk radial direction, so that the work efficiency can also be improved from this arrangement.

In the present embodiment, in such a state that the ear portion 7C, which is one of the pair of ear portions 7B and 7C (the protruding portions) of the friction pad 6, is disposed at one of the guide plate portions 15, the guide protruding portion 15C extends in the same direction as the direction in which the ear portion 7B, which is the other of the pair of ear portions 7B and 7C (the protruding portions) of the friction pad 6, is being inserted when the other ear portion 7B is inserted into the other guide plate portion 15. By this configuration, when the friction pad 6 is attached to the mount member 2 with the pad springs 11 installed thereon, the top surface (the surface on the outer side in the disk radial direction) of the ear portion 7C on the leading-edge side of the fiction pad 6 can be smoothly guided along the guide protruding portion 15C in the direction in which this ear portion 7C advances. As a result, the efficiency of attaching the friction pad 6 can be improved.

In the present embodiment, the guide protruding portion 15C extends in the same direction as the direction in which the friction pad 6 is being attached when the friction pad 6 is attached to the mount member 2 with the side push spring 26 elastically deformed. This configuration allows the direction in which the guide plate protruding portion 15C extends, and the direction in which the ear portion 7C of the friction pad 6 advances to match each other, so that the work efficiency can also be improved from this arrangement.

Figure 14:
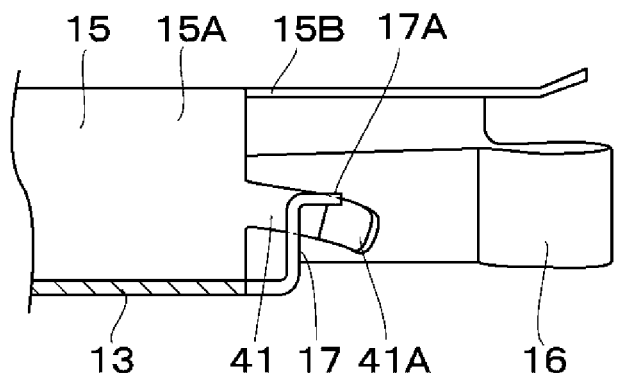
FIG. 14 is a plan view of main portions that depicts a pad spring according to a modification as viewed from the same direction as FIG. 11.

In the present embodiment, the guide protruding portion 15 has been described as being configured to extend linearly by way of example. However, the guide protruding portion is not limited thereto, and, for example, a curved guide protruding portion 41 may be employed, like a modification illustrated in FIG. 14. In this case, the top surface (the surface on the outer side in the disk radial direction) of the ear portion 7C of the friction pad 6 can be guided along the curved guide protruding portion 41 in the direction in which this ear portion 7C advances. In FIG. 14, a distal end side of the guide protruding portion 41 forms a bent portion 41A bent toward the outer side in the disk radial direction.

The present embodiment has been described based on the example in which the spring structure 20 (the return spring 21 and the side push spring 26) is configured as the plate spring made of the metallic plate. However, the present invention is not limited thereto, and may use various kinds of springs such as a spring made of a material other than a metallic plate (for example, a resin material), and a wire spring made of an material other than a plate material (for example, a wire material) as the return spring and the side push spring.

The above-described embodiment has been described based on the example that uses the so-called integral pad spring 11 including the respective guide plate portions 15 and radially biasing plate portions 16, and the like on the inner side and the outer side of the disk 1. However, the present invention is not limited thereto, and may be configured to include, for example, two pad springs shaped as if the pad spring is separated into pieces on the inner side and the outer side of the disk, and dispose them on the inner side and the outer side of the disk, respectively.

The above-described embodiment has been described based on the example in which the single piston 5D is provided in the inner leg portion 5A of the caliper 5. However, the present invention is not limited thereto, and may have, for example, a twin-bore configuration including two pistons in the inner leg portion of the caliper, or a configuration including three or more pistons in the inner leg portion of the caliper.

The above-described embodiment has been described based on the example of a so-called floating caliper type disk brake configured in such a manner that the piston 5 is slidably provided in the inner leg portion 5A of the caliper 5 via the cylinder, and the outer leg portion 5C of the caliper 5 is placed into abutment with the outer-side friction pad 6. However, the present invention is not limited thereto, and may be applied to, for example, a so-called opposed piston type disk brake configured in such a manner that pistons are provided on the inner side and the outer side of the caliper, respectively.

Having described merely several embodiments of the present invention, those skilled in the art will be able to easily understand that the embodiments described as the example can be modified or improved in various manners without substantially departing from the novel teachings and advantages of the present invention. Therefore, such modified or improved embodiments are intended to be also contained in the technical scope of the present invention. The above-described embodiments may be arbitrarily combined.

The present application claims priority under the Paris Convention to Japanese Patent Application No. 2014-234512 filed on Nov. 19, 2014. The entire disclosure of Japanese Patent Application No. 2014-234512 filed on Nov. 19, 2014 including the specification, the claims, the drawings, and the abstract is incorporated herein by reference in its entirety.

REFERENCE SIGNS LIST 1 disk
2 mount member
3 pad guide (support portion)
3A outer wall surface (surface on the outer side in the disk radial direction)
3C bottom wall surface (bottom surface)
5 caliper
6 friction pad
7B, 7C ear portion (protruding portion)
11 pad spring
15 guide plate portion
15A outer-side portion (portion that abuts against the surface of the pad guide on the outer side in the disk radial direction)
15C, 41 guide protruding portion
26 side push spring (rotational direction biasing member)

The invention claimed is:

1. A disk brake comprising:
a mount member configured to be fixed to a non-rotatable portion of a vehicle, the mount member including support portions arranged to support a pair of friction pads disposed on both side surfaces of a disk, the support portions being formed opposite from each other on both sides in a rotational direction of the disk;
a caliper disposed on the mount member displaceably in an axial direction of the disk, the caliper being configured to press the pair of friction pads against the disk; and
a pad spring provided to the mount member and disposed between the mount member and the friction pad,
wherein groove portions are formed at the support portions, respectively, the groove portions being configured in such a manner that protruding portions formed at side edges of the friction pad on the both sides in the rotational direction of the disk are fitted in the groove portions,
wherein the pad spring includes:
a guide plate portion attached so as to be able to abut against a surface of the groove portion of the support portion on an outer side in a radial direction of the disk and a bottom surface of the groove portion, the guide plate portion being configured in such a manner that the protruding portion of the friction pad is slidably displaceable thereon in the axial direction of the disk, and
a guide protruding portion that extends from a portion of the guide plate portion that abuts against the surface of the groove on the outer side in the radial direction of the disk in a direction away from the disk, and
the guide protruding portion further extending inwardly obliquely with respect to a displacement direction of the friction pad.

2. The disk brake according to claim 1, wherein the guide protruding portion further also extends obliquely toward the outer side in the radial direction of the disk with respect to the displacement direction of the friction pad.

3. The disk brake according to claim 1, wherein, in such a state that the protruding portion, which is one of the pair of protruding portions of the friction pad, is disposed at one of the guide plate portions, the one guide protruding portion extends in a same direction as a direction in which the protruding portion, which is the other of the pair of protruding portions of the friction pad, is being inserted when the other protruding portion is inserted in the other guide plate portion.

4. The disk brake according to claim 1, wherein a rotational direction biasing member is installed on at least one of the side edges of the friction pad, the rotational direction biasing member being configured to push the friction pad in the rotational direction of the disk, and
wherein the guide protruding portion extends in the same direction as a direction in which the friction pad is being attached when the friction pad is attached to the mount member with the rotational direction biasing member elastically deformed.

5. The disk brake according to claim 1, wherein the guide protruding portion is formed so as to be curved in an extension direction.

* * * * *